(12) United States Patent
Kadowaki

(10) Patent No.: US 10,657,121 B2
(45) Date of Patent: May 19, 2020

(54) INFORMATION PROCESSING DEVICE, DATA PROCESSING METHOD, AND RECORDING MEDIUM

(71) Applicant: NEC CORPORATION, Tokyo (JP)

(72) Inventor: Takayuki Kadowaki, Tokyo (JP)

(73) Assignee: NEC CORPORATION, Minato-ku, Tokyo (JP)

( * ) Notice: Subject to any disclaimer, the term of this patent is extended or adjusted under 35 U.S.C. 154(b) by 308 days.

(21) Appl. No.: 15/505,276

(22) PCT Filed: Aug. 18, 2015

(86) PCT No.: PCT/JP2015/004100
§ 371 (c)(1),
(2) Date: Feb. 21, 2017

(87) PCT Pub. No.: WO2016/027455
PCT Pub. Date: Feb. 25, 2016

(65) Prior Publication Data
US 2017/0270155 A1 Sep. 21, 2017

(30) Foreign Application Priority Data

Aug. 21, 2014 (JP) .................. 2014-168252

(51) Int. Cl.
*G06F 7/00* (2006.01)
*G06F 16/23* (2019.01)
(Continued)

(52) U.S. Cl.
CPC .......... *G06F 16/2365* (2019.01); *G06F 11/14* (2013.01); *G06F 16/182* (2019.01); *G06F 16/27* (2019.01); *G06F 9/30* (2013.01)

(58) Field of Classification Search
CPC .... G06F 16/2365; G06F 16/182; G06F 16/27; G06F 11/14; G06F 9/30; G06F 8/454; G06F 17/30371
(Continued)

(56) References Cited

U.S. PATENT DOCUMENTS 5,392,390 A * 2/1995 Crozier ............... G06F 15/0208
715/751
5,493,668 A * 2/1996 Elko ..................... G06F 12/084
711/113
(Continued)

FOREIGN PATENT DOCUMENTS

JP 2011-248752 A 12/2011
JP 5488178 B2 5/2014

OTHER PUBLICATIONS

Giuseppe Decandia et al., "Dynamo: Amazon's Highly Available Key-Value Store", In: SOSP '07 Proceedings of twenty-first ACM SIGOPS symposium on Operating systems principles, New York: ACM, ISBN 978-1-59593-591-5, Dec. 2007, pp. 205-220.
(Continued)

*Primary Examiner* — Mohammed R Uddin
(74) *Attorney, Agent, or Firm* — Sughrue Mion, PLLC

(57) ABSTRACT

Distributed batch processing on an eventually consistent storage system is efficiently performed. A control node includes an execution control unit and a re-execution control unit. The execution control unit causes a processing node to execute predetermined processing that includes reading of data for a key stored in a distributed data store. The re-execution control unit determines, after causing the processing node to execute the predetermined processing, presence or absence of a possibility that inconsistency occurred on data for the key stored in the distributed data store at a time of execution of the predetermined processing, based on a representative value of the data. Then, the re-execution
(Continued)

control unit causes, when it is determined that there is a possibility that the inconsistency occurred, the processing node to re-execute the predetermined processing at a time point when resolution of the inconsistency is verified.

8 Claims, 11 Drawing Sheets

(51) Int. Cl.
*G06F 16/27* (2019.01)
*G06F 11/14* (2006.01)
*G06F 16/182* (2019.01)
*G06F 9/30* (2018.01)

(58) Field of Classification Search
USPC .......................... 707/691, 690, 698
See application file for complete search history.

(56) References Cited

U.S. PATENT DOCUMENTS

| | | | | |
|---|---|---|---|---|
| 5,560,005 | A * | 9/1996 | Hoover | G06F 16/27 |
| 5,903,749 | A * | 5/1999 | Kenner | G06F 8/433 |
| | | | | 712/226 |
| 6,564,369 | B1 * | 5/2003 | Hove | G06F 8/71 |
| | | | | 713/1 |
| 7,444,496 | B2 * | 10/2008 | Shiomi | G06F 16/28 |
| | | | | 712/22 |
| 7,647,329 | B1 * | 1/2010 | Fischman | G06F 3/0607 |
| | | | | 707/999.1 |
| 7,672,945 | B1 * | 3/2010 | Chatterjee | G06F 16/907 |
| | | | | 707/999.009 |
| 7,681,105 | B1 * | 3/2010 | Sim-Tang | H03M 13/2909 |
| | | | | 714/763 |
| 7,716,180 | B2 * | 5/2010 | Vermeulen | H04L 67/42 |
| | | | | 707/626 |
| 7,801,866 | B1 * | 9/2010 | Kathuria | G06F 16/2308 |
| | | | | 707/682 |
| 8,396,840 | B1 * | 3/2013 | McHugh | G06F 3/0617 |
| | | | | 707/689 |
| 8,572,106 | B1 * | 10/2013 | Estan | G06F 16/90344 |
| | | | | 707/758 |
| 2004/0210582 | A1 * | 10/2004 | Chatterjee | G06F 16/27 |
| 2006/0050622 | A1 * | 3/2006 | So | G06F 3/0619 |
| | | | | 369/275.1 |
| 2007/0106703 | A1 * | 5/2007 | Shiomi | G06F 16/28 |
| 2007/0156842 | A1 * | 7/2007 | Vermeulen | H04L 67/42 |
| | | | | 709/217 |
| 2010/0162076 | A1 * | 6/2010 | Sim-Tang | H03M 13/2909 |
| | | | | 714/752 |
| 2013/0275656 | A1 * | 10/2013 | Talagala | G06F 12/0246 |
| | | | | 711/103 |
| 2014/0143367 | A1 * | 5/2014 | Dahlin | G06F 3/0617 |
| | | | | 709/213 |
| 2015/0067442 | A1 * | 3/2015 | Shiozawa | G06F 11/1435 |
| | | | | 714/764 |

OTHER PUBLICATIONS

Toshiya Tanaka et al., "Improving Performance of Cassandra by Dynamic Control of Quorum Parameters", The Institute of Electronics, Information and Communication Engineers Technical Report, ISSN 0913-5685, Jul. 21, 2014, pp. 173-178, vol. 114, No. 155.
Written Opinion for PCT/JP2015/004100, dated Nov. 24, 2015.
International Search Report (ISR) for PCT/JP2015/004100, dated Nov. 24, 2015.

* cited by examiner

Fig. 5

121 NODE INFORMATION

| KEY RANGE | NODE IDENTIFIER | HASH VALUE |
|---|---|---|
| 1 to 4 | DN1-N1 | (HASH VALUE OF NODE "DN1-N1") |
| 5 to 8 | DN1-N2 | (HASH VALUE OF NODE "DN1-N2") |
| 9 to 12 | DN2-N2 | (HASH VALUE OF NODE "DN2-N2") |
| ⋮ | ⋮ | ⋮ |

FR(x): Read File
SR(x): data Store Read
SW(x): data Store Write
P(x): Process

INFORMATION PROCESSING DEVICE, DATA PROCESSING METHOD, AND RECORDING MEDIUM

CROSS REFERENCE TO RELATED APPLICATIONS

This is a National Stage of International Application No. PCT/JP2015/004100 filed Aug. 18, 2015, claiming priority based on Japanese Patent Application No. 2014-168252 filed Aug. 21, 2014, the contents of all of which are incorporated herein by reference in their entirety.

TECHNICAL FIELD

The present invention relates to an information processing device, a data processing method, and a recording medium.

BACKGROUND ART

In recent years, eventually consistent data store is widely utilized along with development of a scale-out type system configuration. The eventually consistent data store is a distributed data store in which, in the CAP theorem regarding consistency, availability, and partition-tolerance of a distributed system, the consistency is relaxed and the availability and the partition-tolerance are given importance. In the distributed data store, mass data are stored and distributed batch processing is utilized in order to efficiently perform analysis and manipulation of the mass data.

For example, when an eventually consistent storage service, such as Amazon S3 (registered trademark), is utilized, storage of mass data such as files into the Amazon S3 and batch processing that includes manipulation of stored data are executed by a plurality of computers.

FIG. 9 is a block diagram illustrating a configuration of a general distributed system that employs such distributed batch processing.

Referring to FIG. 9, the distributed system includes a control node 700, a plurality of processing nodes 800, and a distributed data store 900. The distributed data store 900 is an eventually consistent data store described above, duplicates data contained in a processing-target file, and stores the data into a plurality of data store nodes 910. The control node 700 instructs each processing node 800 to execute a job of the distributed batch processing. Each processing node 800 executes the job of the distributed batch processing with respect to the data designated by the control node 700.

FIG. 10 is a diagram illustrating an example of definitions of operations of the distributed batch processing.

In the example in FIG. 10, the distributed batch processing is made up of definitions of two jobs, a "job 1" and a "job 2", and definitions of split execution regarding the respective jobs, "split by X" and "split by D". The distributed batch processing is executed as follows. First, the control node 700 allocates data (file data) X (X1, X2, . . . ) contained in a file to each processing node 800 (split by X). Each processing node 800 executes the job 1 on the allocated data X (X1, X2, . . . ). The job 1 reads, from the file, the allocated file data X (X1, X2, . . . ) (FR(X)), and writes the file data as data D (D1, D2, . . . ) into the distributed data store 900 (SW(D)). When the job 1 on all the file data X (X1, X2, . . . ) by the processing nodes 800 ends, the control node 700 allocates the data D (D1, D2, . . . ) to each processing node 800 (split by D). Each processing node 800 executes the job 2 on the allocated data D (D1, D2, . . . ). The job 2 reads the allocated data D (D1, D2, . . . ) from the distributed data store 900 (SR(D)) and performs predetermined processing (P(D)). The job 2 writes a result of the processing as data E (E1, E2, . . . ) into the distributed data store 900 (SW(E)).

In the eventually consistent data store, even immediately after writing of data, consistency of reading of the data is not assured. For example, when a process A updating the data X updates a value of the data X in a certain data store node 910, a certain amount of time is needed before a result of the update is reflected (synchronized) in the other data store nodes 910 that store replicas of the data X. Therefore, even when, immediately after the update of the data X by the process A, another process B reads the data X, there is a possibility that, when the data X are read from another data store node 910, a value different from the value of the updated data X may be read.

FIG. 11 is a diagram illustrating an example of data processed by distributed batch processing in the distributed system in FIG. 9.

In the example in FIG. 11, there is a possibility that data read in the job 2 may be data before the update (synchronization) by the job 1, like data D6'. In this case, a false result E6' of the process is written into the distributed data store 900.

A technique for solving such a problem regarding consistency of reading of data in an eventually consistent data store is disclosed in, for example, PTL 1. In the technique of PTL 1, a time point at which data is certainly fixed is specifically determined by using a logical clock value at a time of command reception in each data store node.

Furthermore, as a related technique, PTL 2 discloses a technique in which, in an eventually consistent data store, an error in an execution sequence of an operation is detected on the basis of a reception time of the operation, and the operation is re-executed in a correct sequence.

CITATION LIST

Patent Literature

[PTL 1] Japanese Patent No. 5488178
[PTL 2] Japanese Patent Application Laid-open Publication No. 2011-248752

SUMMARY OF INVENTION

Technical Problem

When the foregoing distributed batch processing is performed on an eventually consistent data store, it is necessary to verify the data store is in a state in which consistency is assured, after the job 1, by a technique, such as the foregoing technique of PTL 1, and then to start the job 2. Alternatively, it is necessary that every time data are read from the data store in the job 2, consistency of the data is verified before the reading. Therefore, the job processing speed decreases.

An object of the present invention is to provide an information processing device, a data processing method, and a recording medium that are capable of solving the foregoing problem and efficiently performing distributed batch processing on an eventually consistent storage system.

Solution to Problem

An information processing device according to an exemplary aspect of the invention includes: execution control means for causing processing means to execute predetermined processing that includes reading of data for a key stored in an eventually consistent storage system; and re-execution control means for determining, after causing the processing means to execute the predetermined processing, presence or absence of a possibility that inconsistency occurred on data for the key stored in the eventually consistent storage system at a time of execution of the predetermined processing, based on a representative value of the data, and for causing, when it is determined that there is a possibility that the inconsistency occurred, the processing means to re-execute the predetermined processing at a time point when resolution of the inconsistency is verified.

A data processing method according to an exemplary aspect of the invention includes: causing processing means to execute predetermined processing that includes reading of data for a key stored in an eventually consistent storage system; determining, after causing the processing means to execute the predetermined processing, presence or absence of a possibility that inconsistency occurred on data for the key stored in the eventually consistent storage system at a time of execution of the predetermined processing, based on a representative value of the data; and causing, when it is determined that there is a possibility that the inconsistency occurred, the processing means to re-execute the predetermined processing at a time point when resolution of the inconsistency is verified.

A computer readable storage medium according to an exemplary aspect of the invention records thereon a program causing a computer to perform a method including: causing processing means to execute predetermined processing that includes reading of data for a key stored in an eventually consistent storage system; determining, after causing the processing means to execute the predetermined processing, presence or absence of a possibility that inconsistency occurred on data for the key stored in the eventually consistent storage system at a time of execution of the predetermined processing, based on a representative value of the data; and causing, when it is determined that there is a possibility that the inconsistency occurred, the processing means to re-execute the predetermined processing at a time point when resolution of the inconsistency is verified.

Advantageous Effects of Invention

An advantageous effect of the present invention is that distributed batch processing on an eventually consistent storage system can be efficiently performed.

BRIEF DESCRIPTION OF DRAWINGS

FIG. 5 is a diagram illustrating an example of node information 121 in an example embodiment of the present invention;

DESCRIPTION OF EMBODIMENTS

Figure 10:
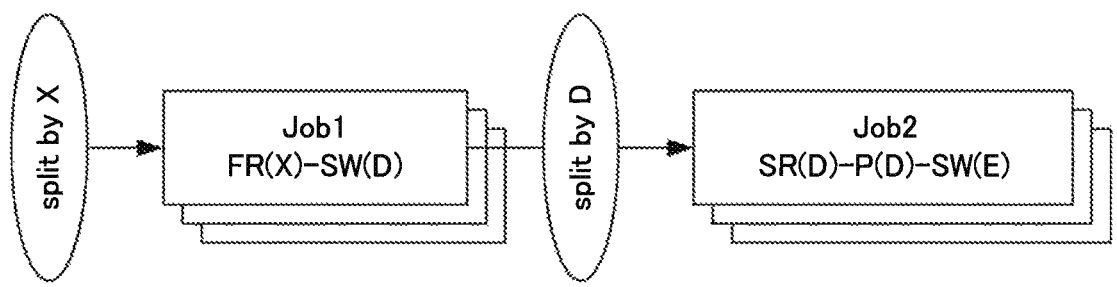
FIG. 10 is a diagram illustrating an example of definitions of operations of distributed batch processing.

Example embodiments of the present invention will be described using as an example a distributed system that executes distributed batch processing as in FIG. 10 described above.

First, a configuration of an example embodiment of the present invention will be described.

Figure 2:
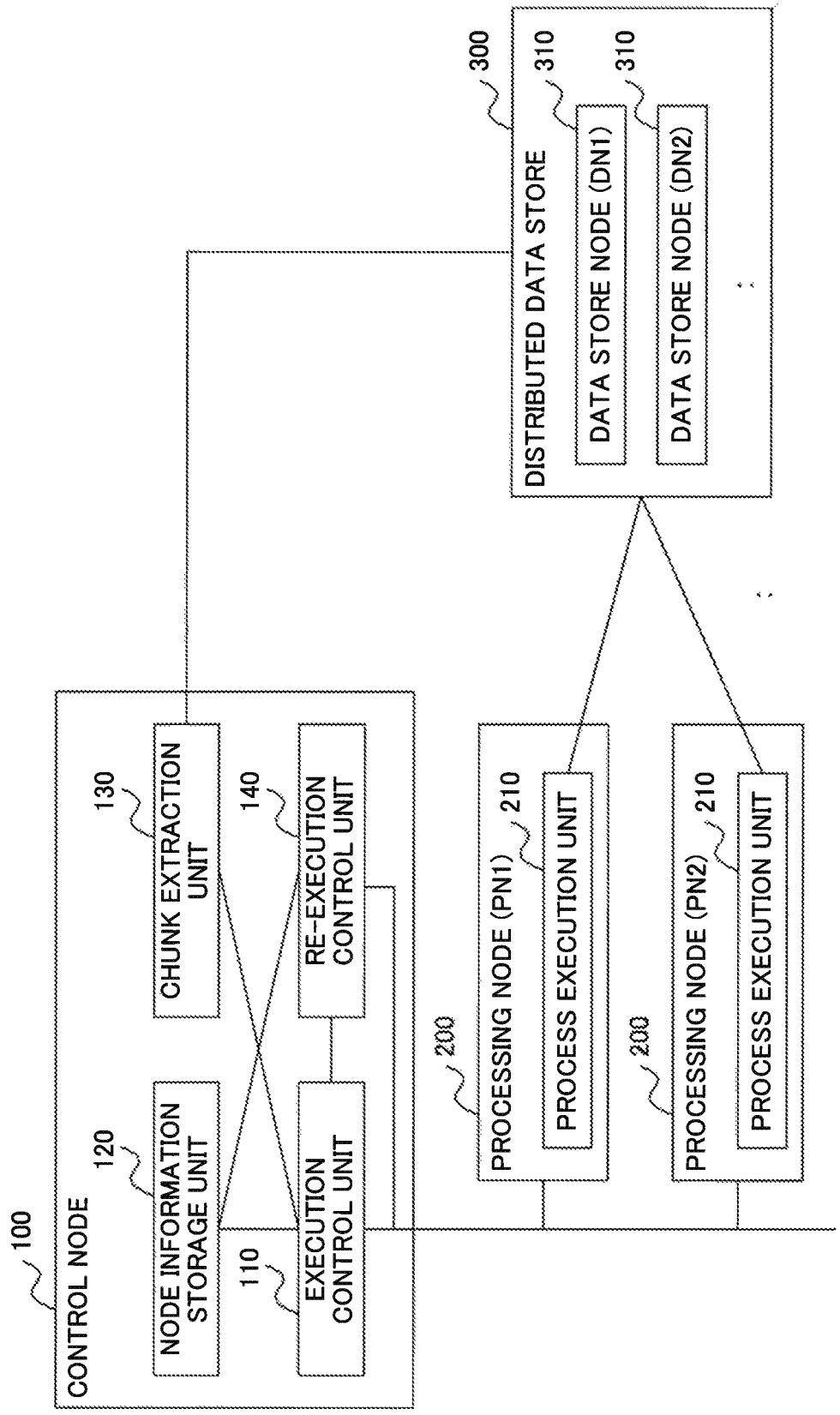
FIG. 2 is a block diagram illustrating a configuration of a distributed system in an example embodiment of the present invention.

FIG. 2 is a block diagram illustrating a configuration of a distributed system in an example embodiment of the present invention.

Referring to FIG. 2, the distributed system includes a control node 100, one or more processing nodes (or processing means) 200 "PN1", "PN2", . . . , and a distributed data store (or distributed storage system) 300. Note that what is in " " following a sign indicates an identifier of a component element represented by that sign.

The control node 100, the processing nodes 200, and the distributed data store 300 are connected by a network or the like. The control node 100 is an example embodiment of the information processing device of the present invention. Each processing node 200 is, for example, a computer that includes a CPU (central processing unit). Furthermore, the distributed data store 300 is an eventually consistent data store described above.

The distributed data store 300 includes a plurality of data store nodes (or a plurality of regions) 310 "DN1", "DN2", . . . . Each data store node 310 stores data for each of a plurality of keys and a hash tree. The hash tree represents hash values of the data stored in a data store node 310.

Figure 4:
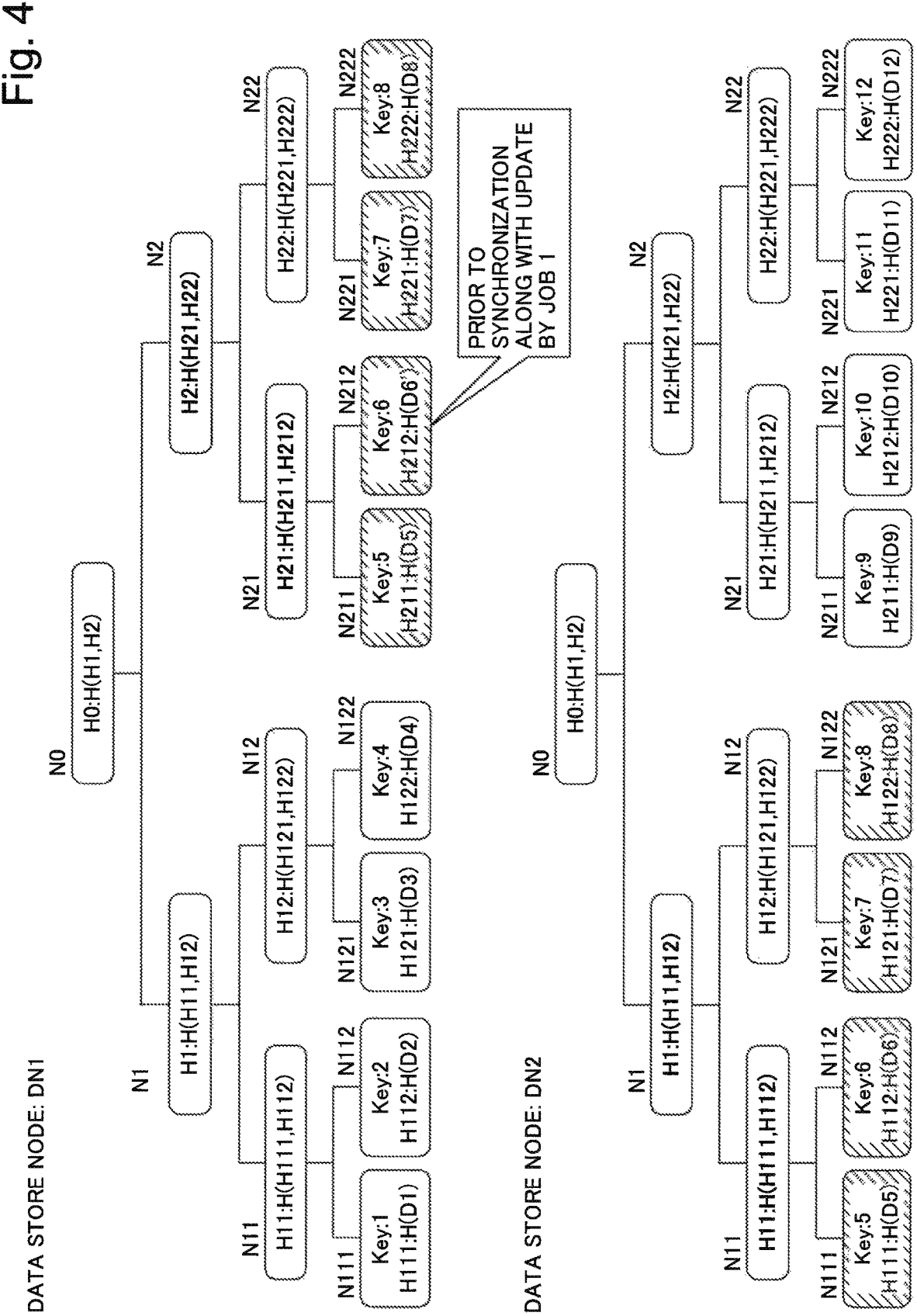
FIG. 4 is a diagram illustrating an example of a hash tree in an example embodiment of the present invention.

FIG. 4 is a diagram illustrating an example of a hash tree in an example embodiment of the present invention.

In leaf nodes of a hash tree, the keys of the data stored in a data store node 310 and hash values as values (representative values) that represent the data for the keys are set. In each node above the leaf nodes, as a representative value concerning the data of all the leaf nodes of the subtree whose root node is that node, a hash value (combined hash value) that is a value combining the hash values of all the child nodes of that node is set.

In the example in FIG. 4, in a leaf node "N111" of a hash table of the data store node 310 "DN1", a key "1" and a hash value "H111=H(D1)" of data "D1" for the key "1" are set. Likewise, in a leaf node "N112", a key "2" and a hash value "H112=H(D2)" of data "D2" for the key "2" are set. Furthermore, in a parent node "N11" of the leaf nodes "N111" and "N112", a hash value "H11=H(H111, H112)" that is a value combining the hash values "H111" and "H112" of the leaf nodes "N111" and "N112" is set. Still further, in a parent node "N1" of the nodes "N11" and "N12", a hash value "H1=H(H11, H12)" that is a value combining the hash values of the nodes "N11" and "N12" is set.

Note that a hash value other than the combined hash value may also be used as long as that value represents the data of all the leaf nodes of the subtree.

Furthermore, a value other than the hash value may also be used as the representative value as long as that value represents the data. Still further, as long as a set made up of a plurality of keys and a representative value concerning the data of all the keys belonging to the set can be associated, the set made up of the plurality of keys may be represented by a method other than the hash tree.

In the distributed data store 300, the data for each key is duplicated and stored in a plurality of data store nodes 310. In the example embodiment of the present invention, in units of subtrees starting at a predetermined layer in the hash tree, pieces of the data for a plurality of keys belonging to such subtrees are duplicated and stored into two data store nodes 310.

In the example in FIG. 4, pieces of the data for keys "5 to 8" are stored in the data store nodes 310 "DN1" and "DN2". These pieces of data correspond to a subtree below a node "N2" in the hash tree of the data store node 310 "DN1" and to a subtree below a node "N1" in the hash tree of the data store node 310 "DN2".

Note that when a data value stored in a data store node 310 is updated, the hash value of the hash tree is also updated by a control unit (not illustrated) or the like in the data store node 310 or the distributed data store 300.

Furthermore, when the processing node 200 accesses (writes, reads) data in the distributed data store 300, the access-destination data store node 310 is not designated by the processing nodes 200 but determined by the control unit or the like in the distributed data store 300. Furthermore, the distributed data store 300 is an eventually consistent data store as stated above. Therefore, immediately after the writing of data for a certain key, the consistency of the reading of data for that key is not assured.

The control node 100 includes an execution control unit 110, a node information storage unit 120, a chunk extraction unit 130, and a re-execution control unit 140.

The chunk extraction unit 130 extracts a set made up of a plurality of keys (hereinafter, referred to as a chunk) from the hash tree stored in a data store node 310. Here, for example, the chunk is extracted in the unit of the subtree where data is duplicated as described above.

The execution control unit 110 designates processing-target file data for a plurality of processing nodes 200 and instructs the processing nodes 200 to execute the job 1 of the distributed batch processing. Furthermore, after the job 1 on all the file data ends, the execution control unit 110 designates a chunk extracted by the chunk extraction unit 130 as a processing-target chunk for the plurality of processing nodes 200 and instructs the processing nodes 200 to execute the job 2 (predetermined processing).

The node information storage unit 120 stores node information 121. The node information 121 indicates information regarding a chunk for which job execution has been instructed in the hash tree.

FIG. 5 is a diagram illustrating an example of the node information 121 in an example embodiment of the present invention.

The node information 121 includes a "key range", a "node identifier", and a "hash value". Here, the "key range" indicates a key set (range) of the chunk designated in the job 2 whose execution has been instructed. The "node identifier" indicates the root node of a subtree that corresponds to the chunk. In the "node identifier", an identifier of the root node of the subtree that corresponds to the chunk in the hash tree is set together with an identifier of the data store node 310 in which the hash tree is stored. The "hash value" indicates a combined hash value set in the root node of the subtree that corresponds to the chunk (hereinafter, referred to as the hash value of the chunk).

The re-execution control unit 140 determines the presence or absence of a possibility that inconsistency (conflict) of data for any key in the key set of the processing-target chunk occurred at the time of execution of the job 2. When it is determined that there is a possibility that conflict occurred, the re-execution control unit 140 identifies a key that has a possibility of the conflict. Then, the re-execution control unit 140, at the time point of verification of resolution of the conflict regarding the identified key (synchronization of the data for the key), designates the identified key and instructs the processing node 200 to re-execute the job 2.

Here, the presence or absence of a possibility that conflict of data for the same key stored in two data store nodes 310 occurred at the time of execution of the job 2 is determined as follows.

For example, assume that the data value for a key in one data store node 310 and the data value for that key in another data store node 310 after the end of the job 1 but before execution of the job 2 are identical. In this case, before execution of the job 2, update of the data for the key by the job 1 is reflected between the data store nodes 310, and conflict does not occur at the time of execution of the job 2. Therefore, the data read in the job 2 is the data after the update by the job 1.

On the other hand, assume that the data value for a key in one data store node 310 and the data value for that key in another data store node 310 after the end of the job 1 but before execution of the job 2 are different. In this case, before execution of the job 2, the update of the data by the job 1 is not reflected between the data store nodes 310, and there is a possibility that conflict occurred at the time of execution of the job 2. Therefore, the data read in the job 2 is either the data after the update or the data before the update.

In an example embodiment of the present invention, the re-execution control unit 140 performs the foregoing determination of the presence or absence of a possibility of conflict on the key set of the chunk, collectively, by using the hash value of the chunk as follows. The re-execution control unit 140 compares the hash value of the chunk in one data store node 310 (the hash value of the node information 121) and the hash value of the chunk of the same key set in another data store node 310 which acquired before execution of the job 2. Then, when the hash values of the chunks are different, the re-execution control unit 140 determines that there is a possibility that conflict of the data for a key in the key set of the same reading-target chunk occurred at the time of execution of the job 2.

The processing nodes 200 include a process execution unit 210. The process execution unit 210 executes the job 1 by using the file data designated by the execution control unit 110 of the control node 100. Furthermore, the process execution unit 210 executes the job 2 by using the data for each key of the key set of the chunk designated by the execution control unit 110. Furthermore, the process execution unit 210 re-executes the job 2 by using the data for the key designated by the re-execution control unit 140. The plurality of processing nodes 200 may execute designated jobs in parallel.

Note that the control node 100 may be a computer that includes a CPU and a storage medium storing a program and that operates under a control based on the program.

Figure 3:
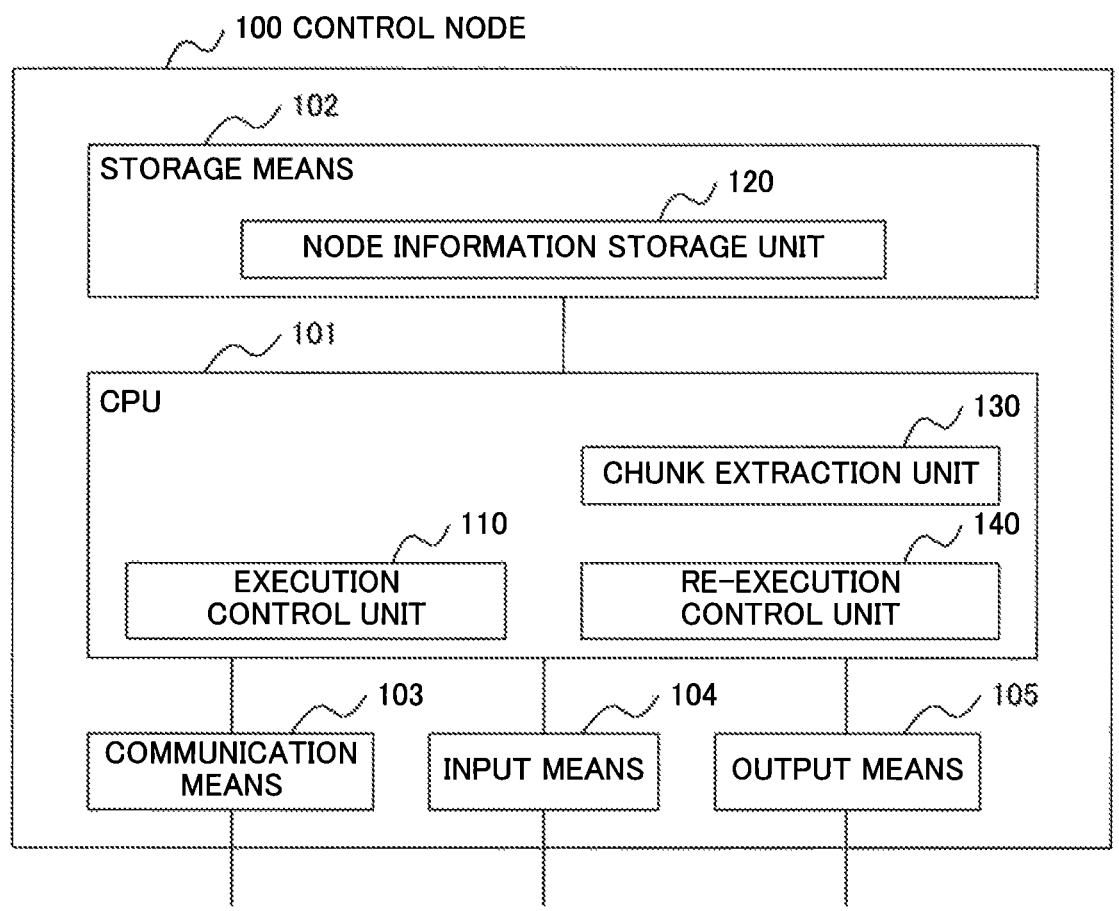
FIG. 3 is a block diagram illustrating a configuration of a control node 100 realized by a computer in an example embodiment of the present invention.

FIG. 3 is a block diagram illustrating a configuration of the control node 100 realized by a computer in an example embodiment of the present invention. The control node 100 includes a CPU 101, storage means (storage medium) 102, such as a hard disk or a memory, communication means 103 for performing data communication with other devices and the like, input means 104 such as a keyboard, and output means 105 such as a display or the like.

The CPU 101 executes a computer program for realizing the functions of the execution control unit 110, the chunk extraction unit 130, and the re-execution control unit 140. The storage means 102 stores data (node information 121) of the node information storage unit 120. The communication means 103 receives hash tables of the data store nodes 310 from the distributed data store 300. Furthermore, the communication means 103 instructs the processing nodes 200 to execute the job of the distributed batch processing. The input means 104 accepts instructions to execute the distributed batch processing from users and the like. The output means 105 outputs results of execution of the distributed batch processing to the users and the like.

Furthermore, the component elements of the control node 100 illustrated in FIG. 2 may be independent logic circuits.

Next, the operation of an example embodiment of the present invention will be described.

Figure 6:
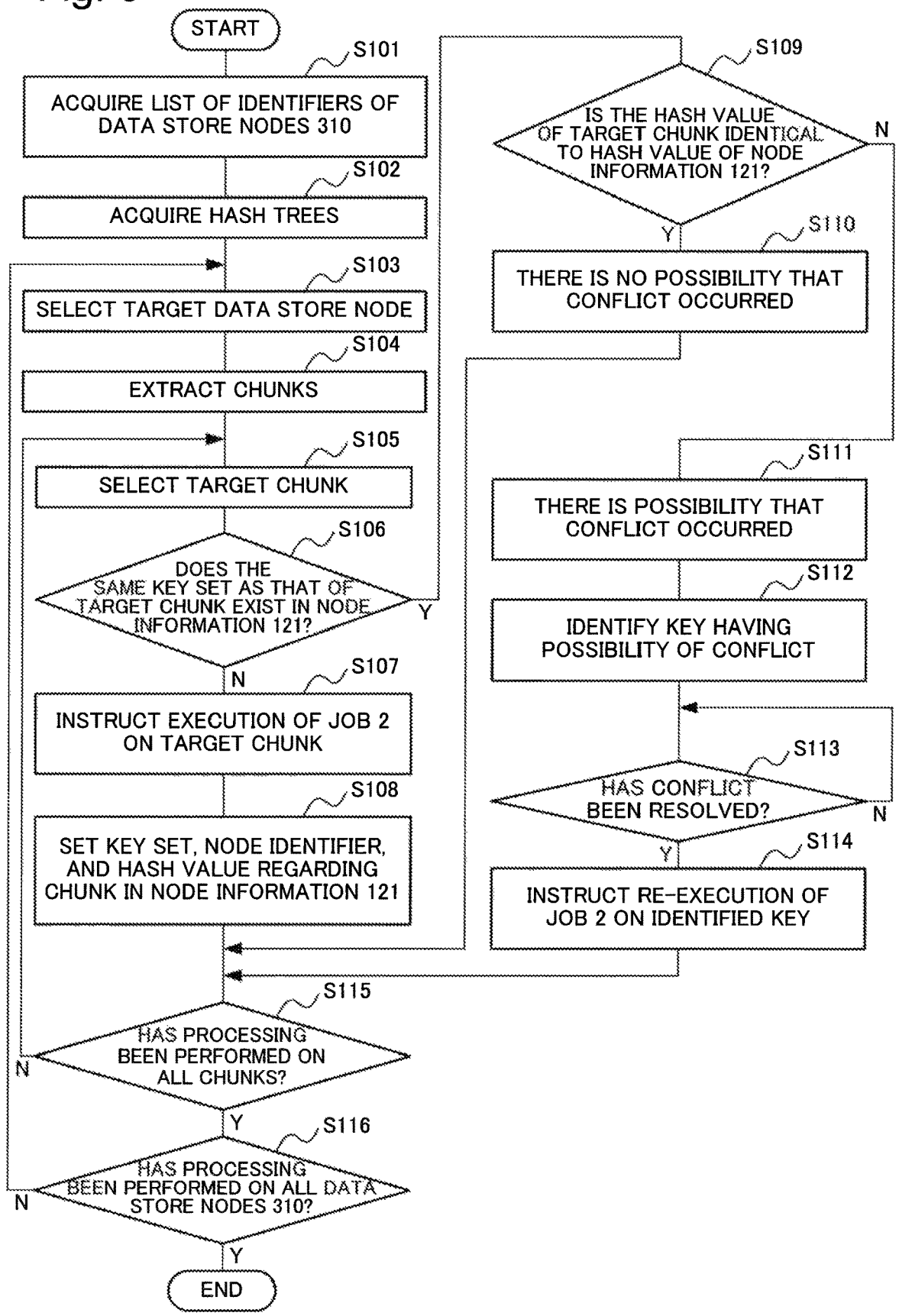
FIG. 6 is a flowchart illustrating a process by the control node 100 in an example embodiment of the present invention.

FIG. 6 is a flowchart illustrating processing by the control node 100 in an example embodiment of the present invention.

When the execution of the job 1 in each processing node 200 ends, the job execution control unit 110 instructs the chunk extraction unit 130 to extract a chunk according to a definition "split by D" of split execution concerning the job 2.

The chunk extraction unit 130 acquires a list of identifiers of the data store nodes 310 that constitute the distributed data store 300 (step S101).

The chunk extraction unit 130 acquires a hash tree from each data store node 310 included in the acquired list (step S102).

The chunk extraction unit 130 selects one of the data store nodes 310 included in the acquired list as a data store node 310 of processing-target (target data store node) (step S103).

The chunk extraction unit 130 extracts chunks from the hash tree of the target data store node (step S104).

The execution control unit 110 selects one of the extracted chunks as a chunk of processing-target (target chunk) (step S105).

The execution control unit 110 determines whether the key set that is the same as the key set of the target chunk exists in the node information 121 (step S106).

When in step S106 the key set that is the same as the key set of the target chunk does not exist in the node information 121 (NO in step S106), the execution control unit 110 allocates the target chunk to one of the plurality of processing nodes 200. Then, the execution control unit 110 designates the target chunk for the processing node 200 and instructs the processing node 200 to execute the job 2 (step S107).

The processing node 200 instructed to execute the job 2 executes the job 2 on the designated target chunk. In the job 2, the reading of data for each key of the key set of the target chunk stored in the distributed data store 300 is performed.

The execution control unit 110 sets in the node information 121 the key set, the node identifier, and the hash value regarding the chunk for which job execution was instructed (step S108). Here, as the node identifier and the hash value, the identifier of the root node of the subtree that corresponds to the target chunk in the hash tree of the target data store node and the combined hash value (the hash value of the target chunk) set in the root node are set. The execution control unit 110 proceeds to the process of step S115.

When, in step S106, the key set that is the same as the key set of the target chunk exists in the node information 121 (YES in step S106), the re-execution control unit 140 extracts the hash value of the target chunk from the hash tree of the target data store node. In other words, the re-execution control unit 140 extracts the combined hash value set in the root node of the subtree that corresponds to the target chunk. Then, the re-execution control unit 140 determines whether the extracted hash value of the target chunk and the hash value for the same key set as that of the target chunk set in the node information 121 are identical (step S109).

When the hash values are identical (YES in step S109), the re-execution control unit 140 determines that there is no possibility that conflict occurred regarding each key of the key set of the target chunk (step S110). In other words, the re-execution control unit 140 determines that there is no possibility that conflict between the data store nodes 310 occurred regarding each key of the key set of the target chunk at the time of execution of the job 2. The re-execution control unit 140 proceeds to the process of step S115.

On the other hand, when the hash values are not identical in step S109 (NO in step S109), the re-execution control unit 140 determines that there is a possibility that conflict occurred regarding a key of the key set of the target chunk (step S111). In other words, the re-execution control unit 140 determines that there is a possibility that conflict between the data store nodes 310 occurred regarding a key of the key set of the target chunk at the time of execution of the job 2.

The re-execution control unit 140 identifies the key that has a possibility of conflict (step S112). Here, the re-execution control unit 140 compares the hash values between the subtree of the target chunk in the hash tree of the target data store node and the subtree indicated by the node identifier for the same key set as that of the target chunk in the node information 121. Then, the re-execution control unit 140 identifies the key of the leaf node whose hash value is different as a key that has a possibility of conflict.

The re-execution control unit 140 waits until the resolution of the conflict concerning the identified key (synchronization of the data for that key) is verified (step S113). Here, the re-execution control unit 140 waits until the hash values of the leaf nodes of the key that have conflict (the leaf nodes having different hash values) become identical.

When the resolution of the conflict is verified (YES in step S113), the re-execution control unit 140 allocates the identified key to one of the plurality of processing nodes 200. Then, the re-execution control unit 140 designates the identified key for that processing node 200 and instructs the processing node 200 to re-execute the job 2 (step S114). Here, the re-execution control unit 140, for example, instructs the re-execution of the job 2 designating the identified key, at the time point of the end of the job 2 for the chunk including the identified key whose execution was instructed in step S107.

The processing node 200 instructed to execute the job 2 re-executes the job 2 on the designated key. In the job 2, the reading of the data for the designated key stored in the distributed data store 300 is performed.

Hereinafter, with respect to all the chunks extracted in step S104, the process from step S105 is repeated (step S115).

Furthermore, with respect to all the data store nodes 310 acquired in step S101, the process from step S103 is repeated (step S116).

Next, concrete examples will be described. Here, assume that, as a result of the execution of the job 1, the data store nodes 310 "DN1" and "DN2" of the distributed data store 300 store hash trees as in FIG. 4. In other words, the data store node 310 "DN1" of the distributed data store 300 stores data for key sets "1 to 4" and "5 to 8" and the data store node 310 "DN2" stores data for key sets "5 to 8" and "9 to 12". With regard to the key "6", the data in the data store node 310 "DN2" has been updated to "D6" but the data in the data store node 310 "DN1" remains the pre-update data "D6", and there is conflict. Furthermore, assume that the sets of keys belonging to the subtrees starting at the second layer from the root node on the hash tree are extracted as chunks.

First, the chunk extraction unit 130 acquires "DN1" and "DN2" as a list of data store nodes 310.

The chunk extraction unit 130 acquires hash trees as in FIG. 4 from the data store nodes 310 "DN1" and "DN2".

The chunk extraction unit 130 selects the data store node 310 "DN1" as a target data store node.

The chunk extraction unit 130 extracts from the hash tree of the data store node 310 "DN1" the key sets "1 to 4" and "5 to 8" belonging to the subtrees starting at the second-layer node "N1" and "N2" as chunks.

The execution control unit 110 selects the key set "1 to 4" as a target chunk.

Because the key set "1 to 4" does not exist in the node information 121, the execution control unit 110 designates the key set "1 to 4" and instructs the processing node 200 "PN1" to execute the job 2.

The processing node 200 "PN1" executes the job 2 on the key set "1 to 4".

The execution control unit 110, as in FIG. 5, sets in the node information 121 the key set "1 to 4", the node identifier "DN1-N1", and the hash value of the node.

Next, the execution control unit 110 selects the key set "5 to 8" as a target chunk.

Because the key set "5 to 8" does not exist in the node information 121 either, the execution control unit 110 designates the key set "5 to 8" and instructs the processing node 200 "PN2" to execute the job 2.

The processing node 200 "PN2" executes the job 2 on the key set "5 to 8".

The execution control unit 110, as in FIG. 5, sets in the node information 121 the key set "5 to 8", the node identifier "DN1-N2", and the hash value of the node.

Next, the chunk extraction unit 130 selects the data store node 310 "DN2" as a target data store node.

The chunk extraction unit 130 extracts from the hash tree of the data store node 310 "DN2" the key sets "5 to 8" and "9 to 12" belonging to the subtrees starting at the second-layer nodes "N1" and "N2" as chunks.

The execution control unit 110 selects the key set "5 to 8" as a target chunk.

The key set "5 to 8" exists in the node information 121 as in FIG. 5. Furthermore, the hash value of the node "N1" in the hash tree of the target data store node "DN2" is different from the hash value for the key set "5 to 8" in the node information 121 in FIG. 5. Therefore, the re-execution control unit 140 determines that there is a possibility that conflict occurred regarding a key of the key set "5 to 8". The re-execution control unit 140 compares the subtree starting at the node "N1" in the hash tree of the target data store node "DN2" and the subtree starting at the node "N2" in the hash tree of the data store node 310 "DN1". Then, the re-execution control unit 140 identifies the key "6" of leaf nodes whose hash values are different as indicated by H(D6) and H(D6'), as a key having a possibility of conflict. In this case, for the key "6", there is a possibility that the job2 read the post-update data "D6" and also there is a possibility that the job2 read the pre-update data "D6".

The re-execution control unit 140 waits until the hash values of the leaf nodes of the key "6" having a possibility of conflict become identical.

At the time point when the data "D6" of the key "6" in the data store node 310 "DN1" is updated to be "D6", the hash values of the leaf nodes of the key "6" become identical (H(D6)).

The re-execution control unit 140 designates the key "6" and instructs the processing node 200 "PN3" to re-execute the job 2.

The processing node 200 "PN3" re-executes the job 2 on the key "6". The job 2 reads, for the key "6", the post-update data "D6".

With what has been described above, the operation of the example embodiment of the present invention is completed.

Figure 1:
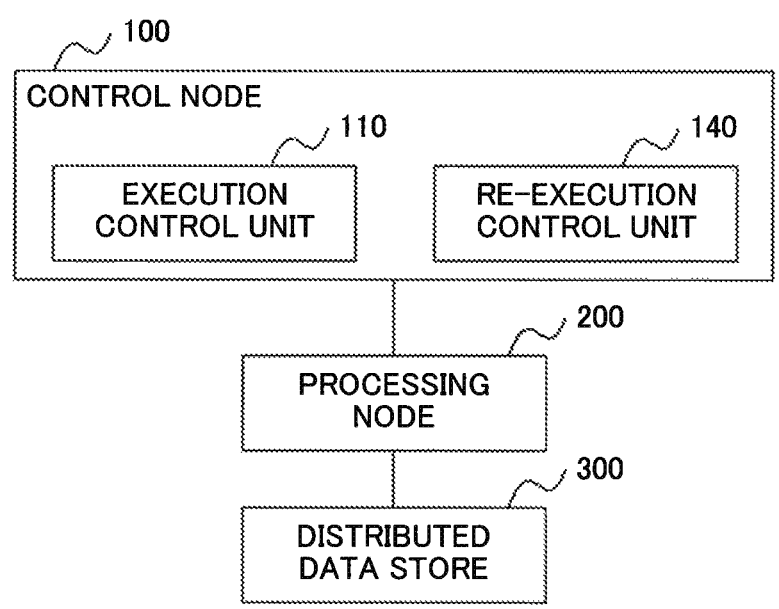
FIG. 1 is a block diagram illustrating a characteristic configuration of an example embodiment of the present invention.

Next, a characteristic configuration of the example embodiment of the present invention will be described. FIG. 1 is a block diagram illustrating a characteristic configuration of the example embodiment of the present invention.

Referring to FIG. 1, a control node 100 (an information processing device) according to the present invention includes an execution control unit 110 and a re-execution control unit 140.

The execution control unit 110 causes a processing node 200 (processing means) to execute predetermined processing that includes reading of data for a key stored in a distributed data store 300 (an eventually consistent storage system).

The re-execution control unit 140 determines, after causing the processing means to execute the predetermined processing, presence or absence of a possibility that inconsistency occurred on data for the key stored in the distributed data store 300 at a time of execution of the predetermined processing, based on a representative value of the data. Then, the re-execution control unit 140 causes, when it is determined that there is a possibility that the inconsistency occurred, the processing node 200 to re-execute the predetermined processing at a time point when resolution of the inconsistency is verified.

According to the example embodiments of the present invention, the distributed batch processing for the eventually consistent storage system can be efficiently performed. The reason for that is that after the processing node 200 is caused to execute predetermined processing, the re-execution control unit 140 determines the presence or absence of a possibility that inconsistency occurred in the data stored in the distributed data store 300 and causes the predetermined processing to be re-executed at the time point when the resolution of the inconsistency is verified.

In a general eventually consistent data store, the possibility of losing consistency is high when the degree of parallelism of the access to the data for identical keys is high, or when there occurs a communication failure between data store nodes or a failure of a data store node. However, when, after the writing of data by the job 1, the reading of data by the job 2 is performed as in the foregoing distributed batch processing, the possibility of losing consistency is low at the time of reading in the job 2. Therefore, when, after the job 2 is caused to be executed, the job 2 is caused to be re-executed on the data having a possibility of conflict at the time of the execution as in the example embodiments of the present invention, the overall throughput is higher than when consistency is checked before execution of the job 2 or before each reading operation.

Furthermore, in the example embodiments of the present invention, the job 2 is caused to be executed in the units of chunks on hash trees, the presence or absence of possibility of conflict occurrence is determined in the units of chunks, and the job 2 is caused to be re-executed only on the key having a possibility of conflict. Because of this, the overall throughput can be further improved.

While the invention has been particularly shown and described with reference to example embodiments thereof, the invention is not limited to these embodiments. It will be understood by those of ordinary skill in the art that various changes in form and details may be made therein without departing from the spirit and scope of the present invention as defined by the claims.

For example, although in the example embodiments of the present invention, the control node 100 and the processing nodes 200 are different devices, one of the plurality of processing nodes 200 may include the various component elements of the control node 100.

Figure 7:
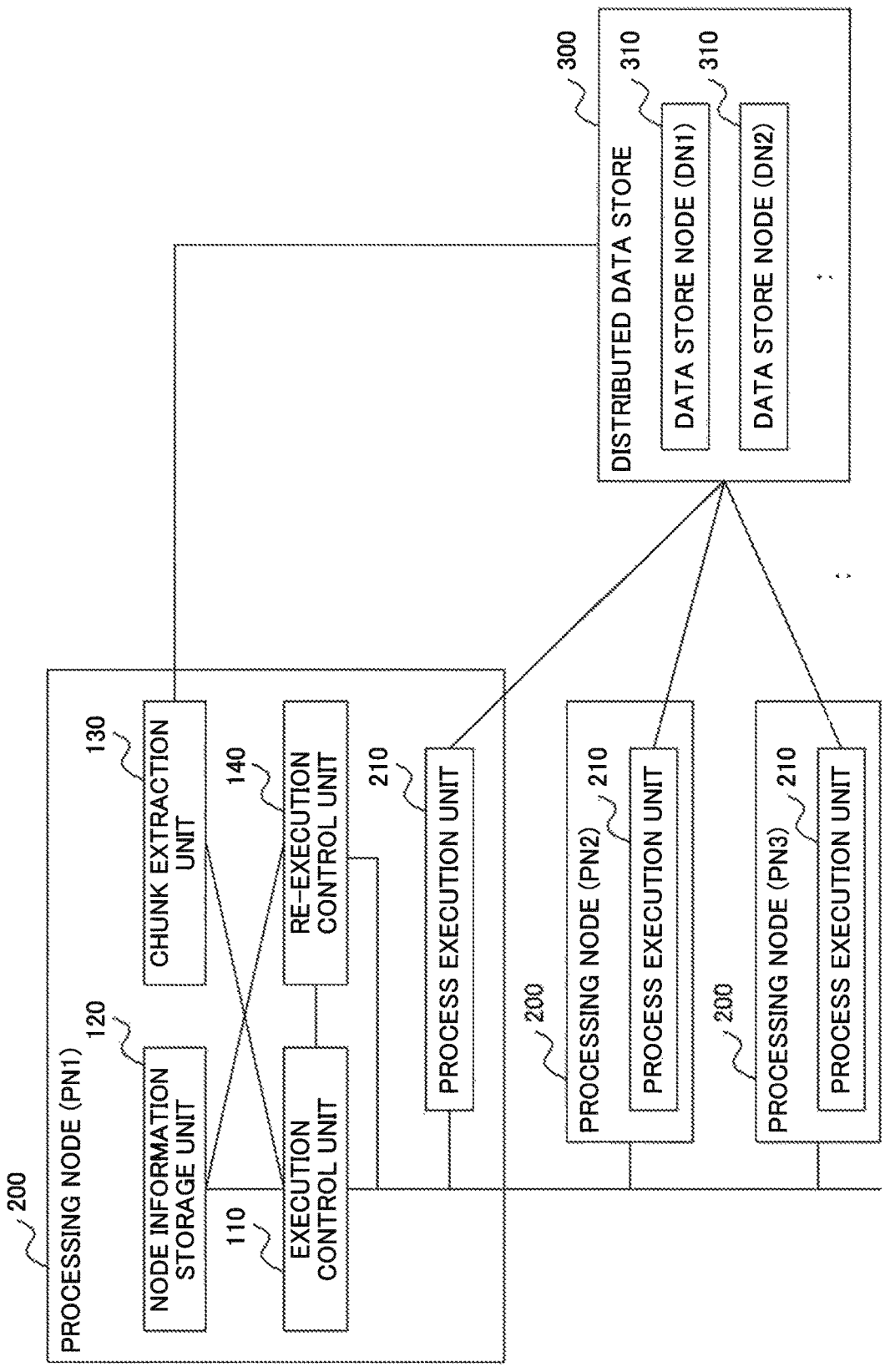
FIG. 7 is a block diagram illustrating another configuration of a distributed system in an example embodiment of the present invention.

FIG. 7 is a block diagram illustrating another configuration of a distributed system in an example embodiment of the present invention.

In the configuration in FIG. 7, a processing node 200 "PN1" includes the execution control unit 110, the node information storage unit 120, the chunk extraction unit 130, and the re-execution control unit 140 in addition to the process execution unit 210. In this case, the execution control unit 110 allocates chunks to one of a plurality of processing nodes 200 that include the processing node 200 "PN1" and causes the processing node 200 to execute the job 2.

Figure 8:
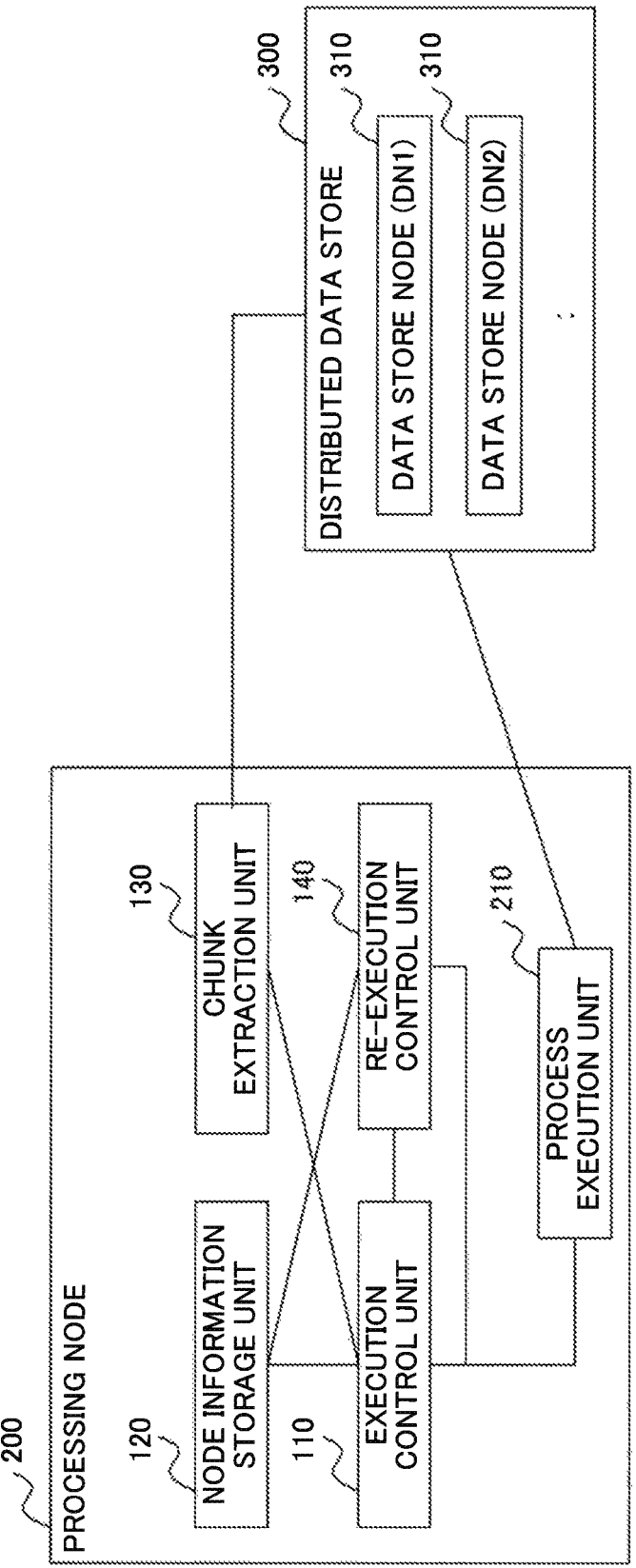
FIG. 8 is a block diagram illustrating still another configuration of a distributed system in an example embodiment of the present invention.
Figure 9:
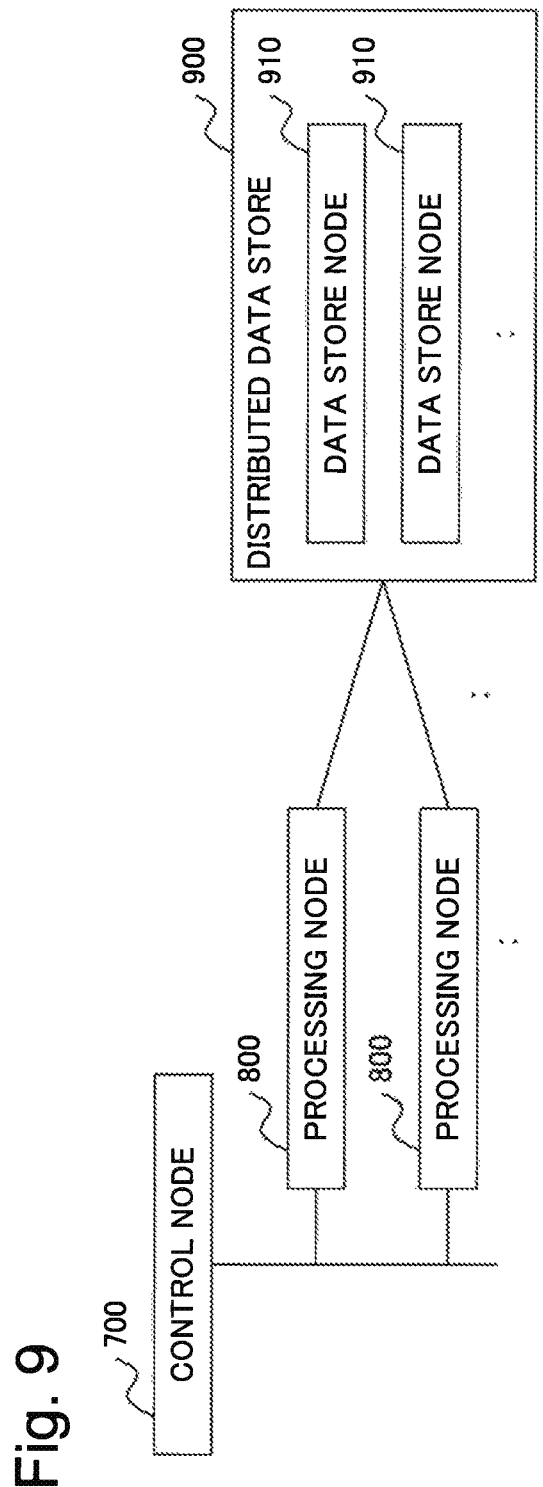
FIG. 9 is a block diagram illustrating a configuration of a general distributed system.

Furthermore, when there is only one processing node 200, the processing node 200 may include the respective component elements of the control node 100. FIG. 8 is a block diagram illustrating still another configuration of a distributed system in an example embodiment of the present invention.

In the configuration in FIG. 8, there is only one processing node 200, and the processing node 200 includes the execution control unit 110, the node information storage unit 120, the chunk extraction unit 130, and the re-execution control unit 140. In this case, the execution control unit 110 sequentially designates chunks for the process execution unit 210 of the host processing node 200 and causes the process execution unit 210 to execute the job 2. Here, the processing on chunks may be sequentially executed and may also be executed in parallel in plurality of processes.

Furthermore, although in the example embodiments of the present invention, the data for each key is duplicated and stored in two data store nodes 310, the data may also be stored in three or more data store nodes 310. In this case, the re-execution control unit 140, when it is verified in step S113 that the hash values have become identical (synchronized) following the determination in step S111 that there is a possibility of conflict occurrence, updates the hash value in the node information 121 to the new hash value after the synchronization. Because of this, even when data for each key is stored in three or more data store nodes 310, the job 2 can be re-executed at the time of resolution of inconsistency among all the data store nodes 310.

This application is based upon and claims the benefit of priority from Japanese Patent Application No. 2014-168252, filed on Aug. 21, 2014, the disclosure of which is incorporated herein in its entirety by reference.

REFERENCE SIGNS LIST

100 Control node
101 CPU
102 Storage means
103 Communication means
104 Input means
105 Output means
110 Execution control unit
120 Node information storage unit
121 Node information
130 Chunk extraction unit
140 Re-execution control unit
200 Processing node
210 Process execution unit
300 Distributed data store
310 Data store node
700 Control node
800 Processing node
900 Distributed data store
910 Data store node

The invention claimed is:

1. An information processing device comprising:
a memory storing instructions; and
one or more processors configured to execute the instructions to:
execute predetermined processing that includes reading of data for each of a plurality of keys stored in a distributed storage system including a plurality of data store nodes;
determine, after executing the predetermined processing for each of the plurality of keys, presence or absence of a possibility that inconsistency between the data store nodes occurred on data for any key among the plurality of keys stored in the distributed storage system at a time of execution of the predetermined processing, based on a representative value of the data for all of the plurality of keys; and
when it is determined that there is a possibility that the inconsistency occurred, identify all of the keys among the plurality of keys having a possibility that the inconsistency occurred, re-execute the predetermined processing for all of the keys identified at a time point when resolution of the inconsistency for all of the keys identified is verified.

2. The information processing device according to claim 1, wherein,
in the distributed storage system, data for each of the plurality of keys is duplicated and stored in first and second regions, and
using a representative value of data for each of the plurality of keys and a representative value concerning all data for the plurality of keys which are generated for each of the first region and the second region, presence or absence of a possibility that inconsistency occurred on data for any of the plurality of keys is determined and a key having a possibility of the inconsistency is identified.

3. The information processing device according to claim 2, wherein
when a representative value concerning all data for the plurality of keys in the first region and a representative value concerning all data for the plurality of keys in the second region, prior to execution of the predetermined processing, are different, it is determined that there is a possibility that inconsistency occurred on data for any of the plurality of keys, and out of the plurality of keys, a key for which data in the first region and data in the second region have different representative values is identified, as a key having a possibility of the inconsistency.

4. The information processing device according to claim 1, wherein the one or more processors are further configured to execute the instructions to execute predetermined preprocessing that includes writing of data into the distributed storage system, and the one or more processors are configured to execute the predetermined processing after the predetermined preprocessing is executed.

5. A data processing method comprising:

executing predetermined processing that includes reading of data for each of a plurality of keys stored in a distributed storage system including a plurality of data store nodes;

determining, after executing the predetermined processing for each of the plurality of keys, presence or absence of a possibility that inconsistency between the data store nodes occurred on data for any key among the plurality of keys stored in the distributed storage system at a time of execution of the predetermined processing, based on a representative value of the data for all of the plurality of keys; and when it is determined that there is a possibility that the inconsistency occurred, identify all of the keys among the plurality of keys having possibility that the inconsistency occurred, re-executing the predetermined processing for all of the keys identified at a time point when resolution of the inconsistency for all of the keys identified is verified.

6. The data processing method according to claim 5, wherein, in the distributed storage system, data for each of the plurality of keys is duplicated and stored in first and second regions, and using a representative value of data for each of the plurality of keys and a representative value concerning all data for the plurality of keys which are generated for each of the first region and the second region, presence or absence of a possibility that inconsistency occurred on data for any of the plurality of keys is determined and a key having a possibility of the inconsistency is identified.

7. The data processing method according to claim 6, wherein, when a representative value concerning all data for the plurality of keys in the first region and a representative value concerning all data for the plurality of keys in the second region, prior to execution of the predetermined processing, are different, it is determined that there is a possibility that inconsistency occurred on data for any of the plurality of keys, and out of the plurality of keys, a key for which data in the first region and data in the second region have different representative values is identified, as a key having a possibility of the inconsistency.

8. A non-transitory computer readable storage medium recording thereon a program causing a computer to perform a method comprising:

executing predetermined processing that includes reading of data for each of a plurality of keys stored in a distributed storage system including a plurality of data store nodes;

determining, after executing the predetermined processing for each of the plurality of keys, presence or absence of a possibility that inconsistency between the data store nodes occurred on data for any key among the plurality of keys stored in the distributed storage system at a time of execution of the predetermined processing, based on a representative value of the data for all of the plurality of keys; and when it is determined that there is a possibility that the inconsistency occurred, identify all of the keys among the plurality of keys having a possibility that the inconsistency occurred, re-executing the predetermined processing for all of the keys identified at a time point when resolution of the inconsistency for all of the keys identified is verified.

* * * * *

UNITED STATES PATENT AND TRADEMARK OFFICE
CERTIFICATE OF CORRECTION

PATENT NO. : 10,657,121 B2
APPLICATION NO. : 15/505276
DATED : May 19, 2020
INVENTOR(S) : Takayuki Kadowaki Page 1 of 1

It is certified that error appears in the above-identified patent and that said Letters Patent is hereby corrected as shown below:

In the Drawings

Figure 11:
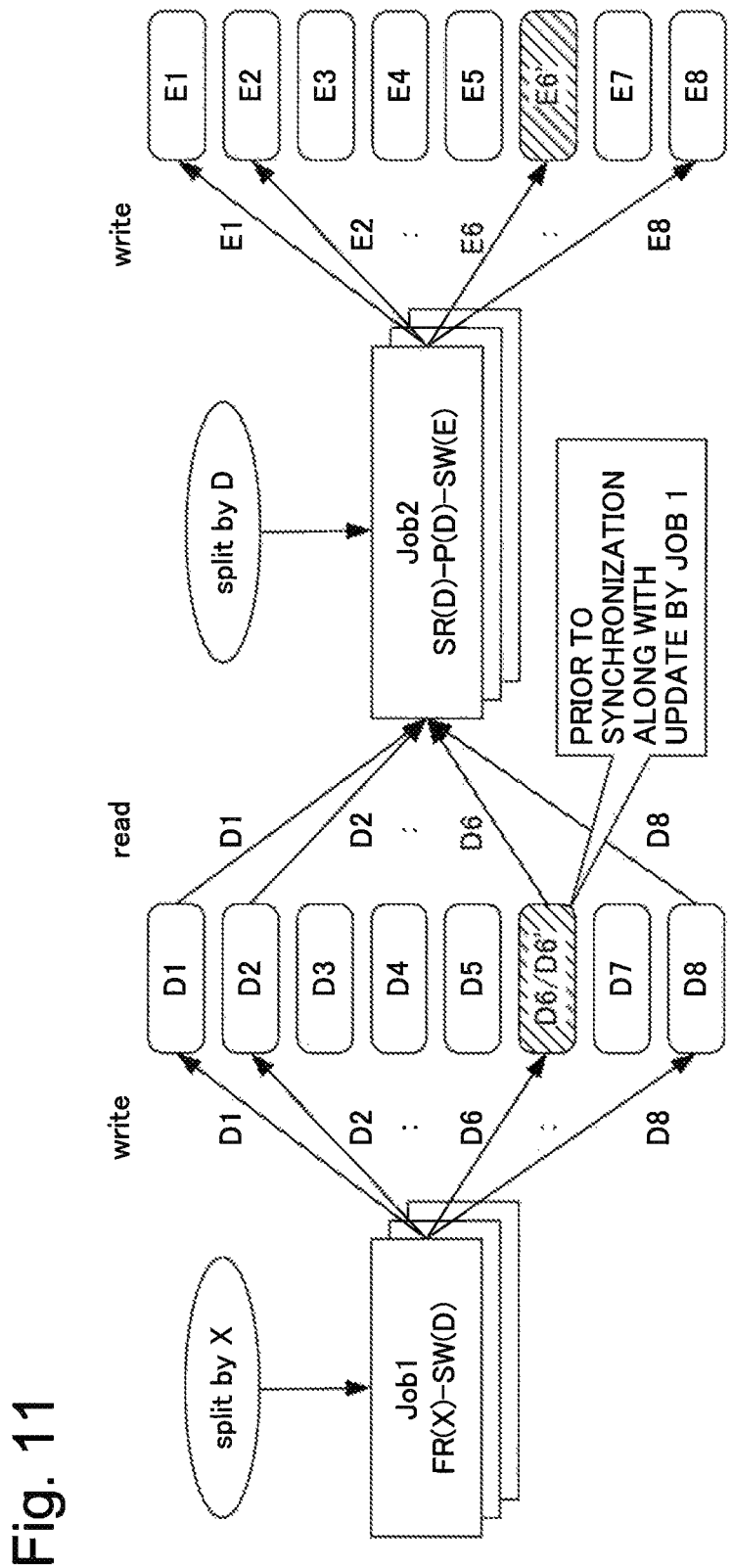
FIG. 11 is a diagram illustrating an example of data processed by the distributed batch processing in the distributed system in FIG. 9.

Sheet 11 of 11, Fig. 11, Second Occurrence; Delete "D6" and insert --D6'-- therefor Sheet 11 of 11, Fig 11, First Occurrence; Delete "E6" and insert --E6'-- therefor In the Specification Column 9, Description of Embodiments, Line 16; Delete ""D6","" and insert --"D6",-- therefor Column 10, Description of Embodiments, Line 9; Delete ""D6"."" and insert --"D6".-- therefor Column 10, Description of Embodiments, Line 13; Delete ""D6""" and insert --"D6"-- therefor In the Claims Column 13, Line 34; In Claim 5, after "having", insert --a--

Signed and Sealed this
Seventeenth Day of November, 2020

Andrei Iancu
*Director of the United States Patent and Trademark Office*